(12) United States Patent
Tran

(10) Patent No.: US 8,819,402 B2
(45) Date of Patent: Aug. 26, 2014

(54) SYSTEM FOR DISPLAYING IMAGE FROM MOBILE DEVICE ON A DISPLAY IN A COMPUTER BY BOOTING THE COMPUTER WITH LIMITED OPERATING SYSTEM AND RELINQUISHING BUS CONTROL TO THE MOBILE DEVICE

(75) Inventor: Teresa Tran, San Diego, CA (US)

(73) Assignee: Sony Corporation, Tokyo (JP)

( * ) Notice: Subject to any disclaimer, the term of this patent is extended or adjusted under 35 U.S.C. 154(b) by 364 days.

(21) Appl. No.: 13/176,860

(22) Filed: Jul. 6, 2011

(65) Prior Publication Data
US 2013/0013904 A1 Jan. 10, 2013

(51) Int. Cl.
| | | |
|---|---|---|
| *G06F 9/00* | (2006.01) | |
| *G06F 15/177* | (2006.01) | |
| *G06F 3/00* | (2006.01) | |
| *G06F 9/24* | (2006.01) | |
| *G06F 13/38* | (2006.01) | |
| *G06F 1/16* | (2006.01) | |
| *G06F 9/44* | (2006.01) | |

(52) U.S. Cl.
CPC ........ *G06F 9/24* (2013.01); *G06F 3/002* (2013.01); *G06F 9/441* (2013.01); *G06F 13/38* (2013.01); *G06F 1/1632* (2013.01); *G06F 1/1626* (2013.01)
USPC .............................................. 713/2

(58) Field of Classification Search
CPC ........... G06F 13/00; G06F 9/441; G06F 9/24; G06F 13/38; G06F 1/1626; G06F 1/1632; G06F 3/002
USPC ............................................. 713/2; 710/303
See application file for complete search history.

(56) References Cited

U.S. PATENT DOCUMENTS

| 6,538,880 B1 * | 3/2003 | Kamijo et al. ............. 361/679.4 |
|---|---|---|
| 7,395,421 B1 * | 7/2008 | Nowlin ............................ 713/2 |
| 2002/0119800 A1 * | 8/2002 | Jaggers et al. ................ 455/550 |
| 2003/0188144 A1 * | 10/2003 | Du et al. ........................... 713/1 |

(Continued)

FOREIGN PATENT DOCUMENTS

WO 2011011368 1/2011

OTHER PUBLICATIONS

Motorola Atrix 4G Accessories—Motorola Mobility, Inc. USA, Accessories That Make a Smartphone Brilliant—Lapdock for Motorola Atrix 4G, available on search date i.e. Mar. 29, 2011, http://www.motorola.com/Consumer/US-EN/Consumer-Product-and-Services/Atrix-Accessories.

Emma Rosher, "The Motorola Atrix—Coming Soon", Feb. 2, 2011, http://ezinearticles.com/?the-Motorola-Atrix--Coming-Soon&id=5842673.

(Continued)

*Primary Examiner* — Thomas Lee
*Assistant Examiner* — Xuxing Chen
(74) *Attorney, Agent, or Firm* — John L. Rogitz

(57) ABSTRACT

A mobile device such as a smart phone can be connected to the USB port of a computer such as a laptop to charge the battery of the mobile device and to synchronize data. Also, when a special button is pressed the computer enters a mobile device support mode in which the computer processor does not boot the full service O.S. but only a small O.S., with the mobile device sending demanded images and sounds to the larger display and speakers of the computer and receiving input from the more capable keyboard of the computer so that a user can use the resources of the computer in operating the typically more limited mobile device.

20 Claims, 3 Drawing Sheets

Full Feature
Computer Logic

(56) References Cited

U.S. PATENT DOCUMENTS

| | | | |
|---|---|---|---|
| 2004/0004603 A1* | 1/2004 | Gerstner et al. | 345/169 |
| 2004/0019724 A1* | 1/2004 | Singleton et al. | 710/303 |
| 2005/0039134 A1 | 2/2005 | Wiggeshoff et al. | |
| 2009/0086030 A1* | 4/2009 | Takamiya | 348/207.1 |
| 2010/0318709 A1 | 12/2010 | Bell et al. | |
| 2011/0312383 A1* | 12/2011 | Youn | 455/558 |

OTHER PUBLICATIONS

"Motorola Atrix 4G Laptop Dock Review", posted Mar. 2, 2011, http://www.phonearena.com/reviews/Motorla-ATRIX-4G-Laptop-Dock-Review_id2667.

Lisa Whelan, "The Motorola Atrix 4G & Laptop Dock. You Can Have Good, Fast & Cheap!", Mar. 9, 2011, http//:socializemobilize.com/2011/03/09/the-motorola-atrix-4g-laptop-dock-you-can-have-good-fast-cheap/.

\* cited by examiner

System

Full Feature Computer Logic

Mobile Device Logic

SYSTEM FOR DISPLAYING IMAGE FROM MOBILE DEVICE ON A DISPLAY IN A COMPUTER BY BOOTING THE COMPUTER WITH LIMITED OPERATING SYSTEM AND RELINQUISHING BUS CONTROL TO THE MOBILE DEVICE

FIELD OF THE INVENTION

The present application relates generally to mobile computer such as smart phone control of displays, speakers, input devices, and even hard disk drives of a larger computer such as a desktop computer.

BACKGROUND OF THE INVENTION

An increasing number of people are beginning to use mobile operating systems on small mobile computers such as so-called smart phones, tablet computers, and personal digital assistants (PDAs) for their primary computing needs. These products offer much flexibility when using portable applications, playing casual games, and for viewing and listening to multimedia content. However, as understood herein most of these devices have a small screen, tiny speakers, and no physical input device other than a touch screen. Also, many of these same users possess a more capable computer system such as a PC-like computer such as a notebook computer which functions to transfer data back and forth between the two devices as well as to charge the mobile product.

As understood herein, there can be times when a user of a small mobile computer doesn't need to use a PC device at all, but nonetheless desires a larger screen, better sound, and easier input for the mobile device. Unfortunately, simple docking systems for mobile computers for the most part do no more than charge the mobile computer and synchronize data between the mobile computer and the PC-like computer.

SUMMARY OF THE INVENTION

Accordingly, a computer such as a laptop or desk top computer includes a housing, a display on the housing, a communication interface such as a universal serial bus (USB) port, and a processor in the housing communicating with a mobile device through the communication interface. The processor executes logic including, responsive to determining that a signal is received indicating mobile device support mode, entering a mobile support mode in which the processor does not boot a full service operating system (O.S.) into memory and instead executes a limited O.S. The processor sends a permission signal to the mobile device indicating that the mobile device support mode is active, and this permission signal may be presented on the display of the mobile device informing the user of expanded capabilities afforded by the computer. The display presents demanded images from the mobile device, and responsive to determining that a signal is received indicating mobile device support mode is suspended, the processor leaves the mobile support mode and boots a full service O.S. into memory.

If desired, the mobile device support mode is entered only responsive to determining that a signal is received indicating mobile device support mode and also determining that the mobile device is connected to the communication interface. In some embodiments, responsive to detection of the mobile device connection at the communication interface, the computer causes charge current to flow through the communication interface to charge a battery of the mobile device, and data is synchronized between the computer and the mobile device.

In example implementations, in the mobile device support mode the processor receives demanded images from the mobile device and controls the display to present the demanded images. In other embodiments, however, in the mobile device support mode the processor relinquishes control of an internal bus of the computer to the mobile device, so that the mobile device sends demanded images directly to the display through the communication interface without assistance or interference from the processor.

If desired, in the mobile device support mode the computer provides to the mobile device access to at least a data storage in the housing. Also, in the mobile device support mode, commands input using a keyboard of the computer may be sent to the mobile device through the communication interface. Responsive to determining that a signal is received indicating mobile device support mode is suspended, the processor can send to the mobile device a revocation signal informing the mobile device that the mobile device support mode is suspended. The signal can be presented on the display of the mobile device.

In another aspect, a mobile computing device such as a smart phone has a processor in a portable housing, a display on the housing, and a communication interface on the housing communicating with the processor. The communication interface is configured for data exchange with a computer. The processor executes logic on a storage medium that causes the processor, responsive to a determination that a permission signal is received from the computer, to send demanded images through the interface to the computer for presentation of the demanded images on a display of the computer. The processor also receives input signals from a keyboard of the computer for use thereof by the processor of the mobile device.

In another aspect, a system includes a mobile computing device (MCD) having an MCD processor and MCD display and a computer having a computer processor and computer display larger than the MCD display. A communication port is on the mobile device and likewise a communication port is on the computer and is configured for communication with the communication port of the MCD. A selector element is manipulable by a person to cause the computer processor to enter a mobile device support mode in which the computer processor does not boot into memory a full service operating system (O.S.) contained on a hard disk drive of the computer and the MCD presents demanded images on the computer display of the computer.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
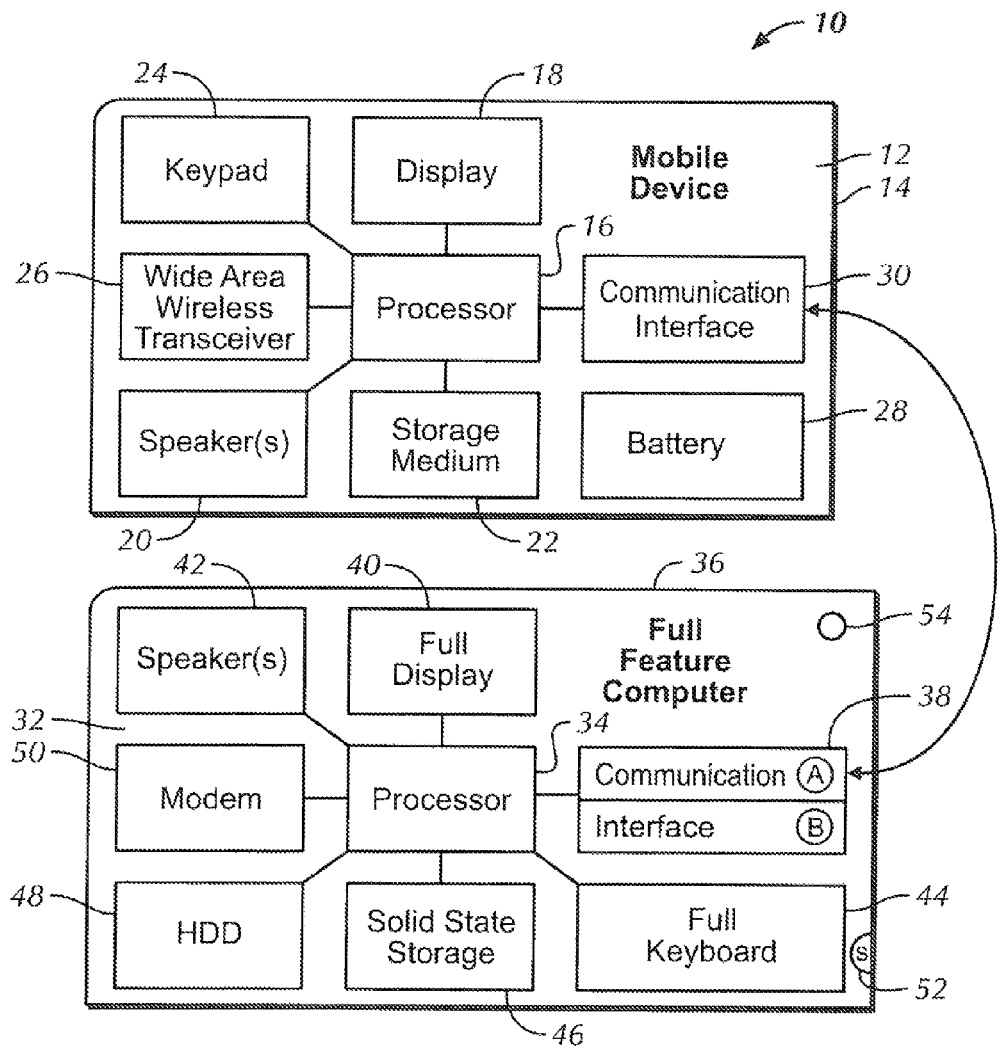
FIG. 1 is a block diagram of an example system in accordance with present principles.

Referring initially to FIG. 1, an example system 10 includes a mobile device 12 such as a smart phone, tablet computer, or PDA that has a portable lightweight plastic housing 14 bearing a digital processor 16. The processor 16 can control a visual display 18, which may be a touch screen display, and an audible display 20 such as one or more speakers.

To undertake present principles, the processor 16 may access one or more computer readable storage media such as but not limited to RAM-based storage 22 (e.g., a chip implementing dynamic random access memory (DRAM)) or flash memory. Software code implementing present logic executable by the processor 16 may also be stored on one of the memories to undertake present principles.

The processor 16 may receive user input signals from various input devices including a telephone-like key pad 24, in addition to receiving input from a touch screen display 18, although in some implementations the key pad 26 can be omitted. The processor 16 may enable communication through a wide area wireless transceiver 26 such as a code division multiple access (CDMA) transceiver and variations thereof, time division multiple access (TDMA) transceiver, frequency division multiple access (FDMA) transceiver, space division multiple access (SDMA) transceiver, orthogonal frequency division multiplex (OFDM) transceiver, global system for mobile communications (GSM) transceiver, WiFi transceiver, etc. Multiple such transceivers may be included. Power is provided to the components of the device 12 by one or more rechargeable batteries 28.

As also shown in FIG. 1, the processor 16 may access a wired or wireless communication interface 30 such as but not limited to a Bluetooth transceiver, a universal serial bus (USB) port, an Ethernet port, etc. By means of the interface 30 the processor 16 may communicate with a full feature computer (FFC) 32 and more particularly with a processor 34 in a housing 36 of the FFC 32, through an FFC communication interface 38 that is complementary in operation and protocol to the transceiver 30 of the device 12. By "full feature" computer is meant simply a PC-like computer such as a notebook computer with a typically larger display 40 than the display 18 of the device 12, larger speakers 42 than the speakers 20 of the device 12, and a full, typically QWERTY keyboard 44, as opposed to a simply touch screen display 18 or telephone-like key pad 24 of the device 12. Also, like the device 12 the FFC 32 includes solid state storage 46 but also mass storage such as a hard disk drive (HDD) 48 and/or optical drive that the device 12 may not possess. The FFC 32 may communicate with the Internet using a wired or wireless modem 50. When the communication interfaces 30, 38 are USB ports, the FFC 32 typically includes multiple USB ports, labeled "A" and "B" in FIG. 1.

The processor 34 of the FFC 36 upon power on initiated by appropriately manipulating a power on switch 52 typically is booted with a small operating system (O.S.) such as a basic input output O.S. (BIOS) stored on sold state storage 46. Then, under control of BIOS, the processor 34 boots a full service O.S. such as a Windows-type O.S. (Windows being a trademark of Microsoft Corp.) from HDD 48 to solid state storage 46. However, according to present principles, a special power on element 54 may be provided in addition to or in lieu of the switch 52 to initiate logic shown in FIGS. 2 and 3 and described below. While FIG. 1 shows the element 54 to be a hardware key or button on the housing 36 of the FFC 32, in other embodiments the element 54 may be a soft key and in other embodiments may be located on the housing 14 of the device 12.

Figure 2:
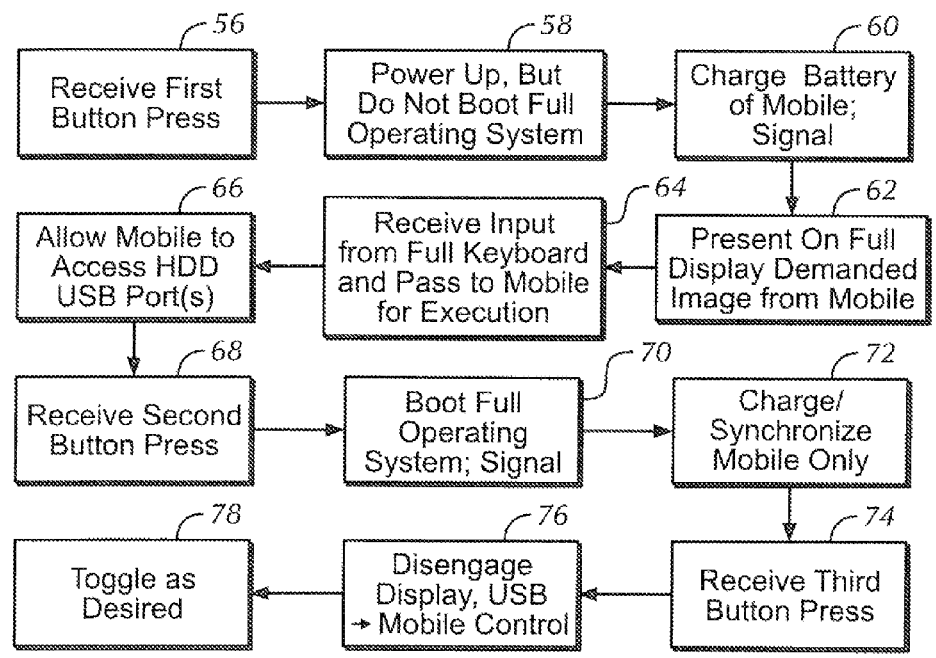
FIG. 2 is a flow chart of example full feature computer (FFC) logic.

Now referring to FIG. 2, logic is shown that may be executed by the FFC 32 responsive to the element 54 being selected by a user, generating a signal that is received at block 56 to, e.g., begin booting of BIOS. In some embodiments, the logic of FIG. 2 may be executed only responsive to a determination that the element 54 has been selected and the mobile device 12 is connected to the communication interface 38. In other embodiments selection of the element 54 alone is sufficient to cause the logic of FIG. 2 to launch. The logic of FIG. 2 may be considered to define a mobile device support mode of the FFC 32.

Moving to block 58, responsive to selection of the element 54 the FFC 32 is powered up but the full O.S. of the FFC is not booted. A small O.S. such as BIOS may contain code executable by the processor 34 to execute subsequent logic shown in FIG. 2.

The processor 34, responsive to detection of the mobile device connection at the interface 38, may cause charge current to flow through the communication interfaces 30, 38 to charge the battery 28 of the mobile device 12 at block 60, and data such as address books, music lists, and the like may be synchronized between the FFC 32 and mobile device 12. This synchronization may occur once initially only or may be repeated at regular intervals. Also at block 60, responsive to a determination that he mobile device 12 is connected to the interface 38 of the FFC 32 the FFC 32 sends a signal to the mobile device 12 informing the mobile device 12 that the mobile device 12 has permission to use certain resources of the FFC 32 according to disclosure below, the FFC 32 being in the mobile device support mode.

Proceeding to block 62, demanded images from the processor 16 of the mobile device 12 are presented on the relatively larger display 40 of the FFC 32. The demanded images are received at the communication interface 38. In some embodiments the processor 34 of the FFC 32 executing a BIOS or small BIOS-like O.S. in the mobile device support mode receives the demanded image and controls the display 40 to present them. In other embodiments the processor 34 of the FFC 32, in the mobile device support mode, essentially relinquishes control of the internal bus of the FFC 32 to the processor 16 of the mobile device 12, so that the processor 16 of the mobile device 12 sends demanded images directly to the full display 40 of the FFC 32 through the interfaces 30, 38 without assistance or interference from the processor 34 of the FFC 32. Note the same principles apply to audio, so that demanded sounds from the processor 16 of the mobile device 12 can be played on the speakers 42 of the FFC 32.

Furthermore, at block 64 when in the logic of FIG. 2, signals generated by user input using the keyboard 44 of the FFC 32 are sent through the interfaces 30, 38 to the processor 16 of the mobile device 12, to cause the mobile device 12 to execute any commands so input. These commands may be relayed by the processor 34 of the FFC 32 executing a BIOS or small BIOS-like O.S. or they may be taken off the internal bus of the FFC 32 by the processor 16 of the mobile device 12 when the mobile device 12 is given control of the bus.

Additionally, at block 66 the mobile device 12 is allowed to access the HDD 48 and, if desired, any unused USB ports (such as the port "B" in FIG. 1) of the FFC 32, again with the cooperation of the processor 34 of the FFC 32 or with the processor 34 of the FFC 32 passively permitting its buses and resources to be controlled by the mobile device 12.

To leave the mobile device support mode, the user can manipulate the element 54 a second time to generate a signal which is received at block 68, causing the processor 34 to fully boot its main O.S. at block 70 and assume control over all of its resources and buses. The FFC 32 also sends a revocation signal to the mobile device 12 informing the mobile device 12 that it no longer has control of FFC resources. If the mobile device 12 remains connected to the interface 38, battery charging and data synchronization may continue at block 72 but otherwise, no further input is sent to the mobile device 12 nor is any output resource of the FFC 32 used to present data from the mobile device 12, but only to present demanded data from the processor 34. A third selection of the element 54 may be received at block 74, causing the FFC 32 to reenter the mobile device support mode at block 76, and this toggling between normal operation of the FFC 32 and the mobile device support mode of the FFC 32 may continue as indicated by block 78 as the user desires.

Figure 3:
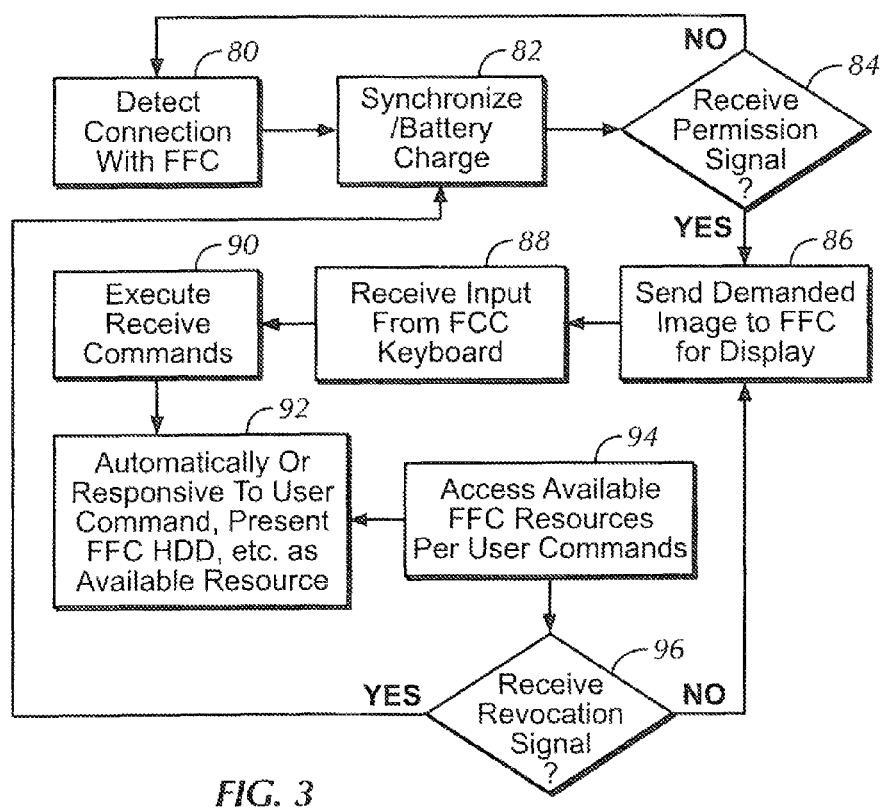
FIG. 3 is a flow chart of example mobile device logic.

It will readily be appreciated that the mobile 12 also executes logic when the FFC 32 is in the mobile device support mode and example logic is shown in FIG. 3, which commences at block 80 with the detection of a connection of the mobile device 12 with the FFC 32. Battery charging and data synchronization commences at block 82, and responsive to a determination at decision diamond 84 that the above-described permission signal (generated at block 60 in FIG. 2) is received at the mobile device 12, demanded images are sent at block 86 from the mobile device 12 through the interfaces 30, 38 for presentation on the display 40 of the FFC 32. Likewise, input signals are received at block 88 by the mobile device 12 from the FFC 32 as input by a user manipulating the keyboard 44 of the FFC 32. The commands so received are executed at block 90. Note that the mobile device can present on its display 18 a message that the mobile device support mode of the FFC 32 is available and, hence, expanded capabilities, which may be listed on the message, are also available.

If desired, responsive to a user command (input, e.g., by means of the touch screen display 18 of the mobile device 12 or the keyboard 44 of the FFC 32) at block 92, the processor 16 of the mobile device 12 may present, on the display 18 of the mobile device 12 and/or on the display 40 of the FFC 32, a listing of available resources of the FFC 32 such as the HDD 48. The presentation of the listing may alternatively occur automatically upon entry into the mobile device support mode. In this way, a user of the mobile device 12 can access the HDD of the 48 of the FFC 32 to read and/or write data thereto at block 94. Access to the USB ports of the FFC 32 may also be afforded to the mobile device 12 according to description above.

Decision diamond 96 simply indicates that responsive to receiving a revocation signal (generated at block 70 of FIG. 2), the mobile device 12 continues battery charging and data synchronization at block 82 but no longer presents demanded images and sounds on the display 40 and speakers 42 of the FFC 32 or accesses the HDD 48 and other resources of the FFC 32 until such time as another permission signal is received from the FFC 32. If no revocation signal is received the logic loops back to block 86. A message indicating that the mobile device support mode is terminated may be presented on the display 18 of the mobile device 12.

It may now be appreciated that in the mobile device support mode, the mobile device 12 transforms from a mobile device into a satisfying desk-level experience with access to more input and output functions.

While the particular MOBILE COMPUTER CONTROL OF DESKTOP INPUT/OUTPUT FEATURES WITH MINIMAL OPERATING SYSTEM REQUIREMENT ON DESKTOP is herein shown and described in detail, it is to be understood that the subject matter which is encompassed by the present invention is limited only by the claims.

What is claimed is:

1. Computer comprising:
   at least one processor configured to communicate with at least one mobile device through at least one communication interface;
   at least one computer readable storage medium accessible by the processor and bearing instructions which when executed by the processor configure the processor for:
      responsive to determining that a signal is received indicating mobile device support mode, entering a mobile device support mode in which:
         the processor does not boot a full service operating system (O.S.) into memory and instead executes a limited O.S.;
         the processor sends a permission signal to the mobile device indicating that the mobile device support mode is active;
         a display controlled by the processor presents demanded images from the mobile device; and,
         wherein in the mobile device support mode the processor relinquishes control of an internal bus of the computer to the mobile device, so that the mobile device sends demanded images directly to the display through the communication interface without assistance or interference from the processor.

2. The computer of claim 1, wherein the mobile device support mode is entered only responsive to determining that a signal is received indicating mobile device support mode and also determining that the mobile device is connected to the communication interface.

3. The computer of claim 1, wherein the communication interface is a universal serial bus (USB) interface.

4. The computer of claim 1, wherein responsive to detection of mobile device signals at the communication interface, the processor when executing the instructions is configured to cause charge current to flow through the communication interface to charge a battery of the mobile device, and data is synchronized between the computer and the mobile device.

5. The computer of claim 4, wherein data that is synchronized between the computer and the mobile device includes at least one of at least one address book or at least one music list.

6. The computer of claim 1, wherein in the mobile device support mode the processor receives demanded images from the mobile device and controls the display to present the demanded images.

7. The computer of claim 1, wherein in the mobile device support mode the computer provides to the mobile device access to at least a data storage in the housing.

8. The computer of claim 1, wherein in the mobile device support mode commands input using a keyboard of the computer are sent to the mobile device through the communication interface.

9. The computer of claim 1, wherein responsive to determining that a signal is received indicating mobile device support mode is suspended, the processor when executing the instructions is configured to send to the mobile device a revocation signal informing the mobile device that the mobile device support mode is suspended.

10. The computer of claim 1, wherein the processor when executing the instructions is configured for, responsive to determining that a signal is received indicating mobile device support mode is suspended, leaving the mobile device support mode and booting a full service O.S. into memory.

11. Mobile computing device comprising:

at least one processor configured to control at least one display in a portable housing;

communication interface configured to communicate with the processor, the communication interface being configured for data exchange with a computer;

wherein the processor is configured to execute logic on a storage medium that configures the processor, responsive to a determination that a permission signal is received from the computer, to send demanded images through the interface to the computer for presentation of the demanded images on a display of the computer and to receive input signals from a keyboard of the computer for use thereof by the processor of the mobile device; and wherein responsive to receiving a revocation signal from the computer, the processor when executing the logic is configured to present a message on the display of the mobile computing device indicating demanded images from the mobile computing device will no longer be presented on the display of the computer.

12. The device of claim 11, wherein responsive to a user command the processor when executing the logic is configured to present on the display of the mobile computing device and/or on the display of the computer a listing of available resources of the computer that may be accessed through the communication interface by the processor of the mobile computing device.

13. The device of claim 11, wherein responsive to a determination that the computer is in communication with the communication interface, the processor when executing the logic is configured to automatically present on the display of the mobile computing device and/or on the display of the computer a listing of available resources of the computer that may be accessed through the communication interface by the processor of the mobile computing device.

14. The mobile computing device of claim 11, wherein responsive to receiving the revocation signal the processor when executing the logic is configured to continue battery charging and data synchronization but no longer present demanded images on the computer.

15. System comprising:

mobile computing device (MCD) having an MCD processor and MCD display;

computer having a computer processor and computer display larger than the MCD display;

communication port on the mobile device;

communication port on the computer and configured for communication with the communication port of the MCD; and selector element manipulable by a person to cause the computer processor to enter a mobile device support mode in which the computer processor does not boot into memory a full service operating system (O.S.) contained on a hard disk drive of the computer and the MCD presents demanded images on the computer display of the computer;

wherein in the mobile device support mode the computer processor of the computer relinquishes control of an internal bus of the computer to the MCD, so that the MCD sends demanded images directly to the computer display of the computer through the communication interfaces without assistance or interference from the computer processor of the computer.

16. The system of claim 15, wherein the selector element is a hardware element on the computer.

17. The system of claim 15, wherein the selector element is a software-implemented element.

18. The system of claim 15, wherein the mobile device support mode is entered only responsive to determining that a signal is received indicating mobile device support mode and also determining that the MCD is communicating with the communication interface of the computer.

19. The system of claim 15, wherein in the mobile device support mode the computer processor of the computer receives demanded images from the MCD and controls the computer display of the computer to present demanded images from the MCD processor.

20. The system of claim 15, wherein responsive to determining that a signal is received from the selector element indicating mobile device support mode is suspended, the computer processor sends to the MCD a revocation signal informing the MCD that the mobile device support mode is suspended.

* * * * *